(12) United States Patent
Takemoto et al.

(10) Patent No.: US 8,870,599 B2
(45) Date of Patent: Oct. 28, 2014

(54) CONNECTOR WITH ELECTRIC COMPONENT

(75) Inventors: Masakazu Takemoto, Yokkaichi (JP); Yusuke Tsuchida, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 194 days.

(21) Appl. No.: 13/547,147

(22) Filed: Jul. 12, 2012

(65) Prior Publication Data

US 2013/0040504 A1 Feb. 14, 2013

(30) Foreign Application Priority Data

Aug. 11, 2011 (JP) ................................ 2011-175802

(51) Int. Cl.
H01R 13/66 (2006.01)
H01G 2/04 (2006.01)

(52) U.S. Cl.
CPC ............. *H01R 13/6625* (2013.01); *H01G 2/04* (2013.01)
USPC .................................................... 439/620.21

(58) Field of Classification Search
USPC ............... 439/620.09, 620, 21; 361/807, 810
See application file for complete search history.

(56) References Cited

U.S. PATENT DOCUMENTS

| | | | | |
|---|---|---|---|---|
| 1,580,942 A * | 4/1926 | Alden | ........................... | 439/683 |
| 2,206,736 A * | 7/1940 | Sutter | ........................... | 439/683 |
| 2,901,678 A * | 8/1959 | Noble et al. | ............... | 361/301.2 |
| 4,109,992 A * | 8/1978 | Hughes et al. | ........... | 439/620.21 |
| 4,772,225 A * | 9/1988 | Ulery | ........................ | 439/620.09 |
| 4,878,854 A * | 11/1989 | Cannon | ......................... | 439/236 |
| 4,952,169 A * | 8/1990 | Hayes, Sr. | ...................... | 439/403 |
| 5,125,846 A * | 6/1992 | Sampson et al. | ................. | 439/66 |
| 5,591,041 A * | 1/1997 | Cecil et al. | ..................... | 439/352 |
| 5,932,808 A * | 8/1999 | Hayashi et al. | .................. | 73/724 |
| 6,109,973 A * | 8/2000 | Gronowicz et al. | ...... | 439/620.21 |
| 6,285,541 B1 | 9/2001 | Osaki et al. | | |
| 6,305,963 B1 * | 10/2001 | Felps | ........................... | 439/317 |
| 7,094,104 B1 * | 8/2006 | Burke et al. | ............. | 439/620.01 |
| 7,273,398 B2 * | 9/2007 | Taylor et al. | ............... | 439/620.2 |
| 8,023,272 B2 * | 9/2011 | Shimizu | ........................ | 361/752 |
| 8,550,851 B2 * | 10/2013 | Takemoto | ................ | 439/620.21 |
| 8,553,429 B2 * | 10/2013 | McNamara et al. | .......... | 361/810 |
| 2004/0147140 A1 | 7/2004 | Fan et al. | | |
| 2011/0038133 A1 | 2/2011 | McNamara et al. | | |
| 2012/0077356 A1 * | 3/2012 | Shimizu et al. | ................. | 439/55 |
| 2012/0081835 A1 * | 4/2012 | Shimizu et al. | ............. | 361/306.1 |

FOREIGN PATENT DOCUMENTS

JP 62120278 7/1987
JP 2008124244 5/2008

* cited by examiner

*Primary Examiner* — Neil Abrams
(74) *Attorney, Agent, or Firm* — Gerald E. Hespos; Michael J. Porco; Matthew T. Hespos (57) ABSTRACT

A connector (C) with a capacitor (20) has terminal fittings (10) held in a housing (30) and lead wires (22) of the capacitor (20) are connected. Spaces (S2) are formed around the bases of the lead wires (22) projecting from a main body (21) of the capacitor (20). An electrolytic solution might leak out from the capacitor (20). However, the electrolytic solution spreads away from the lead wires (22) into the spaces (S2) formed around the bases of the lead wires (22). Thus, the electrolytic solution will not adhere to and stay on the lead wires (22).

14 Claims, 9 Drawing Sheets

CONNECTOR WITH ELECTRIC COMPONENT

BACKGROUND OF THE INVENTION

1. Field of the Invention

The invention relates to a connector with an electric component such as a capacitor.

2. Description of the Related Art

U.S. Pat. No. 6,285,541 discloses a connector with a capacitor incorporated therein for removing noise of an electrical/electronic device or the like mounted in an automotive vehicle or the like. A terminal fitting and a lead wire of the capacitor are connected in a case-like housing and the capacitor is sealed by filling epoxy resin or the like into the housing.

An electric component, such as a capacitor, normally is used with a rubber plug or the like to prevent an inner material or fluid, such as an electrolytic solution, from leaking out. However, the electrolytic solution may leak out if, for example, the rubber plug deteriorates. An electrolytic solution that leaks out from a capacitor may adhere to and stay on a base part of the lead wire in the connector that has the capacitor and may cause corrosion of the lead wire.

The invention was completed in view of the above situation and an object thereof is to provide a connector with an electric component in which an inner material or fluid of the electric component is prevented from adhering to and staying on a lead wire even if the inner material or fluid should leak out.

SUMMARY OF THE INVENTION

The invention relates to a connector with an electric component, such as a capacitor, incorporated therein. The connector has a housing and at least one terminal fitting held in the housing. The terminal fitting and at least one lead wire of the electric component are connected in the housing. At least one space is formed substantially adjacent the base of the lead wire projecting from a main body of the electric component. The space is disposed and configured to prevent an inner material or fluid or liquid of the electric component, such as an electrolytic solution of the capacitor, from adhering to and staying on a lead wire even if the inner material or fluid or liquid should leak out. More particularly, any electrolytic solution that may leak out from the capacitor will spread away from the lead wire into the space formed around the base of the lead wire. Thus, the electrolytic solution will not adhere to and stay on the lead wire.

The housing may include an electric component accommodating wall for at least partly accommodating the main body of the electric component inside. A lead wire insertion hole penetrates through the electric component accommodating wall for allowing the lead wire to be led out. The lead wire and the terminal fitting are connected at an outer side of the electric component accommodating wall.

At least one spacer may be provided between a projecting end surface of the main body of the electric component from which the lead wire projects and a substantially facing surface of the electric component accommodating wall that faces the projecting end surface. The space may be formed between the projecting end surface and the facing surface. According to this configuration, the electric component and the terminal fitting can be held in a predetermined positional relationship and the electrolytic solution can be prevented from adhering to and staying on the lead wire by accommodating the main body of the electric component in the interior of the electric accommodating wall The electric component accommodating wall may be formed with at least one exposing window for allowing the space formed between the projecting end surface and the facing surface to be open toward the outside of the electric component accommodating wall. Thus, the space formed around the base of the lead wire can be wider to communicate with an outer space.

An inner diameter of the lead wire insertion hole may be larger than an outer diameter of the lead wire.

The space may be formed at an outer side of the lead wire insertion hole.

The main body of the electric component may be substantially column-like and the lead wire may project in a longitudinal direction of the main body of the electric component from one end surface of the main body in the longitudinal direction.

The electric component accommodating wall may include a tubular portion substantially surrounding the main body of the electric component and an end wall on one end of the tubular portion to extend substantially along an end surface of the main body of the electric component. The lead wire insertion hole may be formed in the end wall. The electric component may be capable of being accommodated in the tubular portion through an opening opposite to the end wall with the lead wire in the lead.

At least one guide may be provided between the lead wire insertion hole and the connecting portion for guiding the lead wire from the lead wire insertion hole toward one surface of a connecting portion of the terminal fitting to be connected to the lead wire.

According this configuration, the lead wire is arranged on the one surface of the connecting portion without contacting the terminal fitting. Thus, the lead wire and the terminal fitting can be connected in a satisfactory manner by preventing bending or the like of the lead wire caused by contact with the terminal fitting.

The guide may be resiliently deformable in a direction in which the lead wire and the connecting portion of the terminal fitting overlap. Thus, the guide will not block satisfactory connection between the terminal fitting and the lead wire. The guide may include a leg projecting forward from the end wall, a trunk projecting from the leg and a head projecting forward from the trunk. The width of the guide may be substantially constant and/or slightly smaller than the width of the end wall portion.

These and other objects, features and advantages of the invention will become more apparent upon reading of the following detailed description of preferred embodiments and accompanying drawings.

DETAILED DESCRIPTION OF THE PREFERRED EMBODIMENTS

Figure 1:
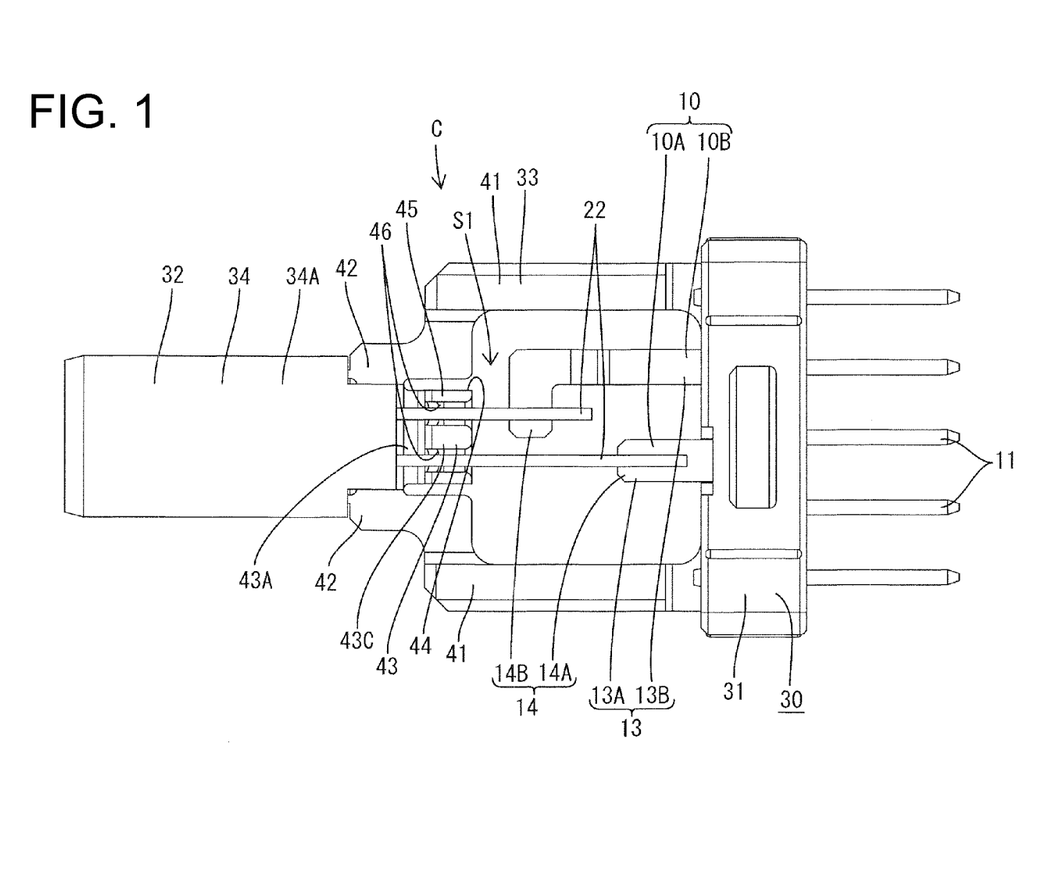
FIG. 1 is a plan view showing a connector with a capacitor according to an embodiment.

A joint connector C with at least one electric component, such as a capacitor in this embodiment, collectively connects unillustrated wires led out from an electrical/electronic device mounted in an automotive vehicle or the like. The connector C with the at least one capacitor includes positive-electrode and negative-electrode joint terminals 10 each having at least one tab 11, and a capacitor 20 between the positive- and negative-electrode joint terminals 10. In the following description, a right side of FIG. 1 (side of the connector C with the capacitor to be connected to an unillustrated mating connector) is a front end, an opposite side is a rear end, and upper and lower sides of FIG. 2 are upper and lower sides in each constituent member.

The joint terminal 10 is formed by cutting or punching out an electrically conductive plate material such as metal and applying a bending, folding and/or embossing. The joint terminal 10 has tabs 11 and a strip-shaped coupling 12 (see FIGS. 8 and 9) coupling the tabs 11. The tabs 11 project at specified intervals or pitch from at least one lateral edge of the coupling 12. Each tab 11 is to be connected to a terminal fitting held in an unillustrated mating connector.

The joint terminal 10 further has an extension 13 on an edge of the strip-shaped coupling 12 opposite to the tabs 11, and a connecting portion 14 at a leading end of the extension 13 is to be connected to a lead wire 22 of the capacitor 20. The extension 13 extends substantially perpendicular to the strip-shaped coupling 12.

Figure 2:
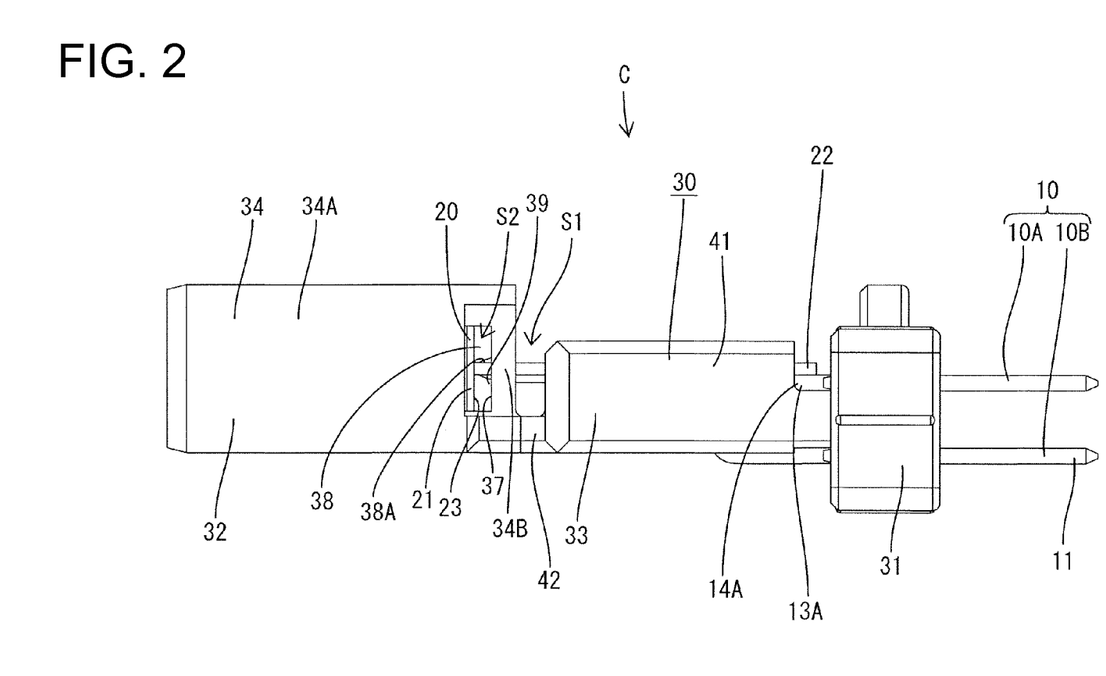
FIG. 2 is a side view showing the connector with the capacitor.

As shown in FIG. 2, the two joint terminals 10 are arranged in two levels in a thickness direction (height direction) of the housing 30. Note that the joint terminal 10 in the upper level is referred to as the joint terminal 10A and the one in the lower level is referred to as the second joint terminal 10B.

Figure 8:
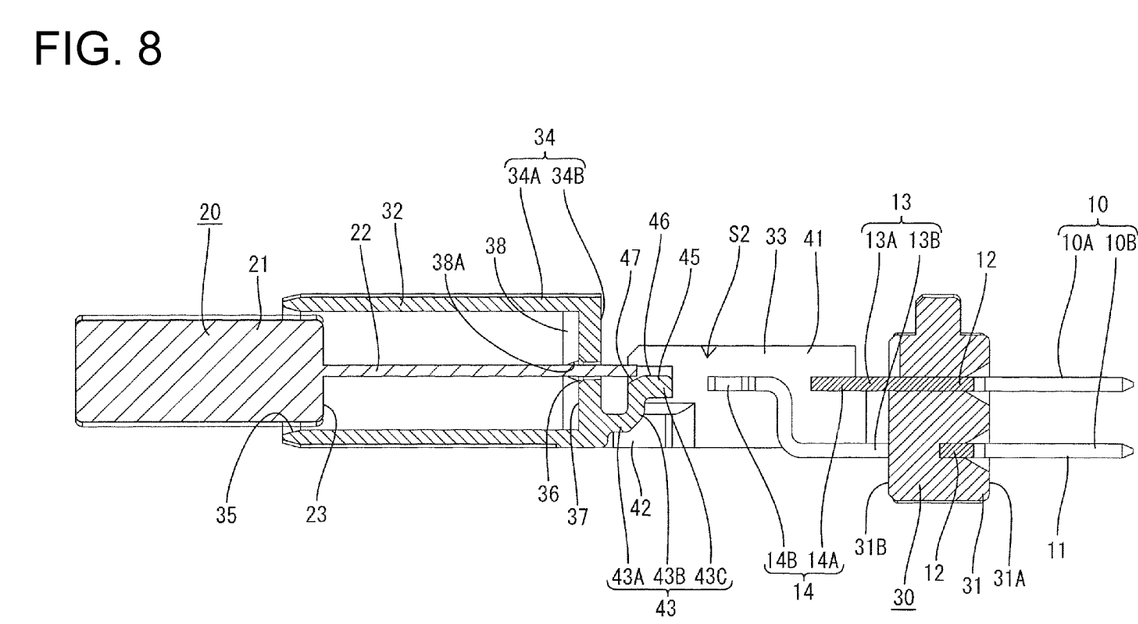
FIG. 8 is a longitudinal section showing the state of accommodating the capacitor into the housing.

The extension 13 (referred to as the first extension 13A) of the first joint terminal 10A is substantially even and flat over the entire length thereof (see FIG. 8). On the other hand, the extending portion 13 (referred to as the second extension 13A) of the second joint terminal 10B is bent at a right angle at two intermediate positions in a length direction to arrange a leading end part thereof at substantially the same height as the first extension 13A. That is, the second extension 13B is bent up at the intermediate position in the length direction and then is bent to extend forward at substantially the same height position as the first extension 13A.

Figure 7:
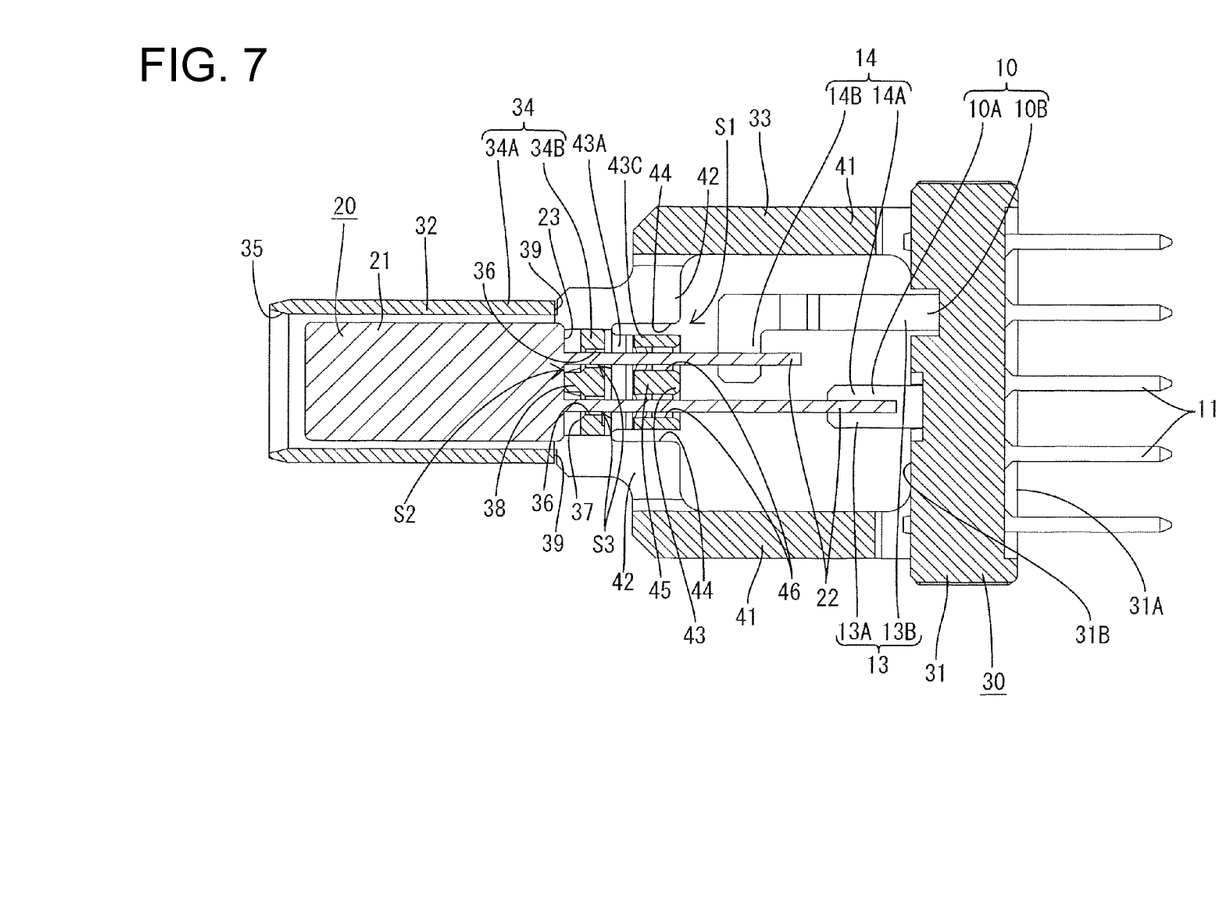
FIG. 7 is a plan view in section showing the capacitor accommodated in the housing.

As shown in FIG. 7, the first and second extensions 13A, 13B are arranged at a specified distance from each other in a width direction of the housing 30 and a leading end part (referred to as a second connecting portion 14B) of the second extension 13B is more forward than a leading end part (referred to as a first connecting portion 14A) of the first extension 13A. In this way, the first and second connecting portions 14A, 14B are arranged at a specified distance from each other in forward and backward directions. Note that the second connecting portion 14B is cut or punched out into a shape bent in toward the first connecting portion 14A at a substantially right angle in the width direction.

The capacitor 20 is an aluminum electrolytic capacitor and includes a substantially cylindrical capacitor main body 21 and positive and negative lead wires led out from a front surface 23 of the capacitor main body 21. The lead wires 22 are substantially round pins and project substantially perpendicularly direction from the front end surface 23 of the capacitor main body 21 and leading end parts thereof are to be connected to the connecting portions 14 of the joint terminals 10. The lead wires 22 are arranged at a specified distance from each other and one of them is longer than the other.

The housing 30 is made e.g. of synthetic resin and is long and narrow in forward and backward directions. A terminal holding portion 31 is formed at the front end for holding the joint terminals 10 and a capacitor holding portion 32 is formed at the rear end for holding the capacitor 20. A capacitor connecting portion 33 is formed between the terminal holding portion 31 and the capacitor holding portion 32 and defines an area where the joint terminals 10 and the capacitor 20 are connected. The capacitor holding portion 32 is located substantially in the widthwise center of the housing 30.

The terminal holding portion 31 is a wall long in the width direction of the housing 30 and couplings 12 of the joint terminals 10 are embedded therein. The terminal portions 11 of the joint terminals 10 project forward from a front surface 31A of the terminal holding portion 31 and the extending portions 13 of the joint terminals 10 extend back from a rear surface 31B of the terminal holding portion 31.

Figure 9:
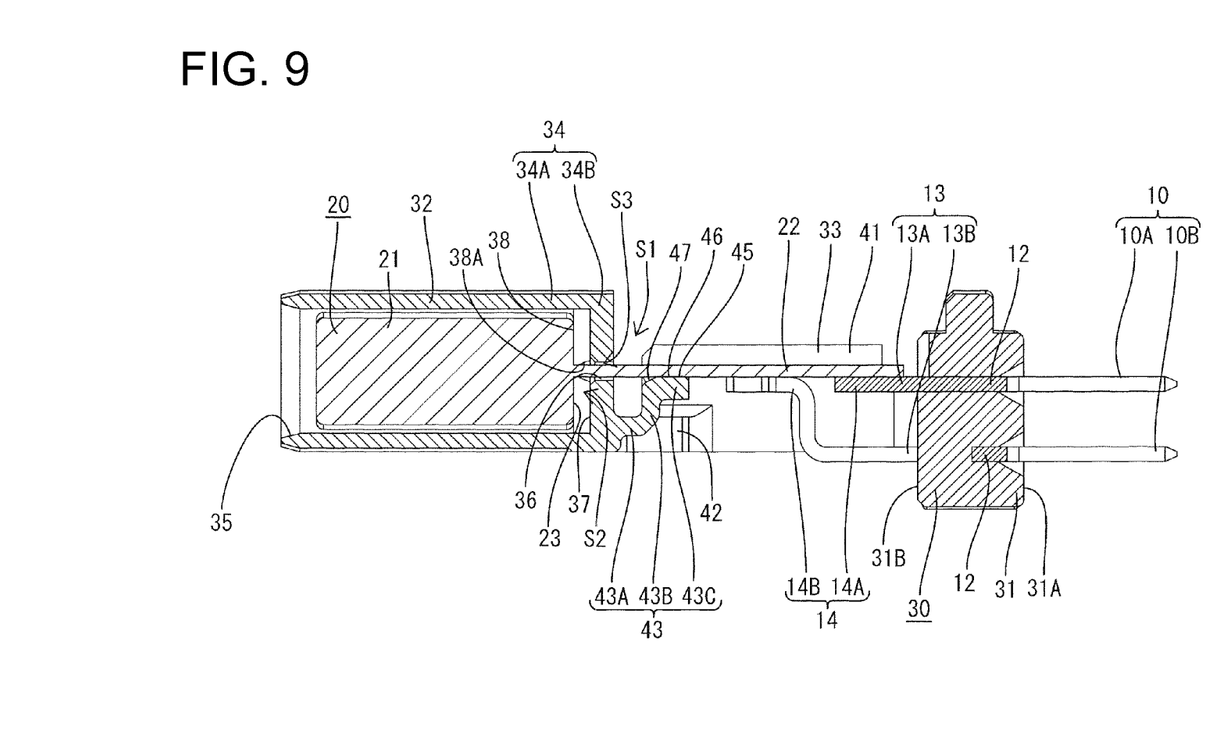
FIG. 9 is a longitudinal section showing the capacitor accommodated in the housing.

The capacitor holding portion 32 includes a capacitor accommodating wall 34 for accommodating the capacitor main body 21. As shown in FIG. 9, the capacitor accommodating wall 34 includes a tubular portion 34A that surrounds the capacitor main body 21 and an end wall 34B on one end of the tubular portion 34A in the longitudinal direction to extend along the front surface 23 of the capacitor main body 21.

The tubular portion 34A is a cylinder with an axis parallel to a projecting direction of the tabs 11 and extends along the outer peripheral surface of the capacitor main body 21. The tubular portion 34A is open backward and a rear end part thereof defines an entrance 35 for the capacitor 20.

Figure 5:
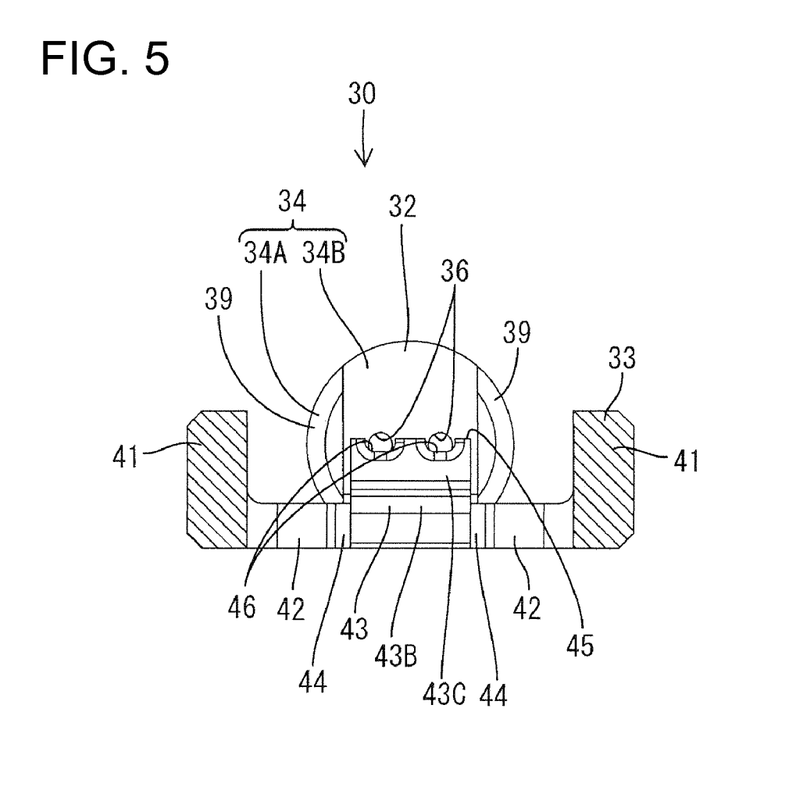
FIG. 5 is a section taken along A-A of FIG. 4.

As shown in FIG. 5, the end wall 34B is substantially in the widthwise center of the tubular portion 34A and extends from the upper end to the lower end of the tubular portion 34A. Additionally, the end wall 34B substantially entirely closes an opening excluding both ends in the width direction of the tubular portion 34A. As shown in FIG. 7, lead wire insertion holes 36 penetrate through the end wall 34B in forward and backward directions for allowing the lead wires 22 to be led out from the capacitor accommodating wall 34. Specifically, two lead wire insertion holes 36 are arranged at a specified distance from each other to allow individual passage of the positive and negative lead wires 22 of the capacitor 20. An inner diameter of each lead wire insertion hole 36 is larger than an outer diameter of the lead wire 22 so that a discharge clearance S3 is formed between the lead wire insertion hole 36 and the lead wire 22 for discharging an inner fluid or constituent, such as an electrolytic solution. Note that the lead wire insertion holes 36 are located at substantially the same height.

At least one spacer 38 projects from the end wall 34B for holding the front end surface 23 of the capacitor main body 21 and the rear surface of the end wall 34B spaced apart. The front end surface 23 of the capacitor main body 21 is brought into contact with this spacer 38 to form inner spaces S2 substantially around or adjacent to the bases of the lead wires 22 in the capacitor accommodating wall 34.

Figure 3:
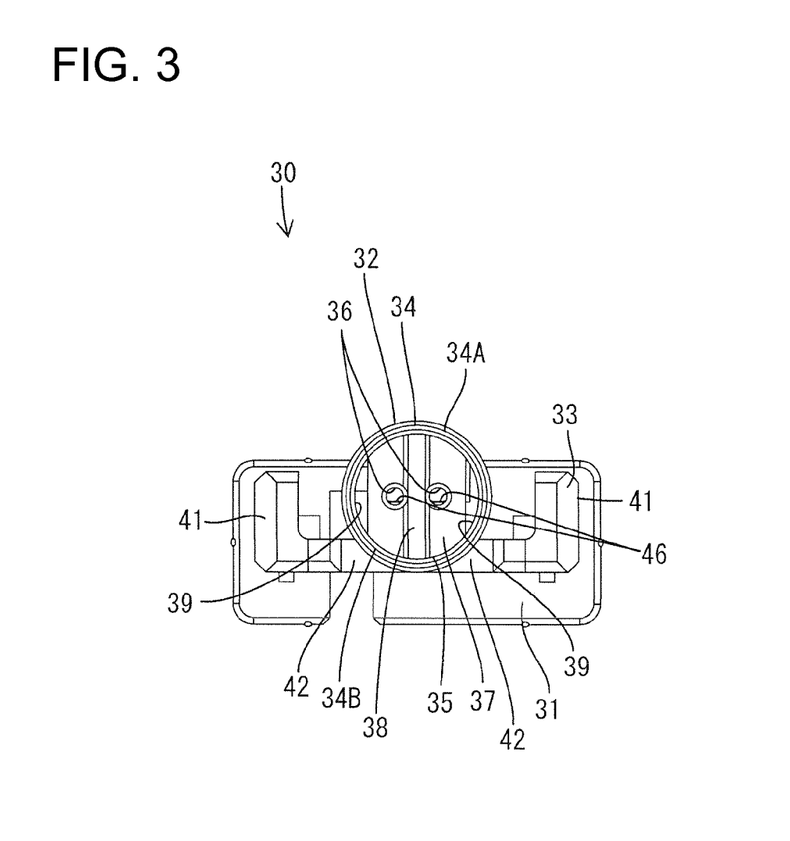
FIG. 3 is a rear view showing a housing without the capacitor.
Figure 4:
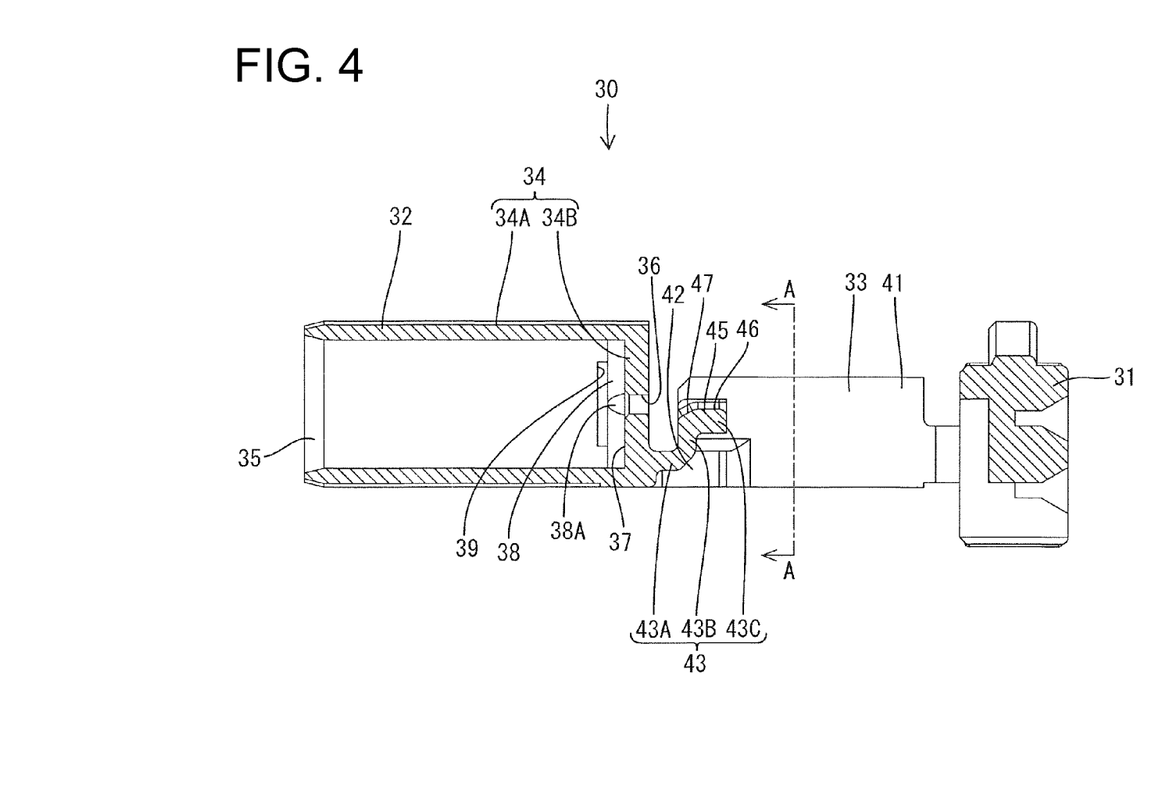
FIG. 4 is a section showing the housing without the capacitor.

As shown in FIG. 3, the spacer 38 is a vertically long wall located between the lead wire insertion holes 36. A projecting distance of the spacer portion 38 is substantially constant in its entirety and the width thereof is slightly narrowed in a projecting direction. The spacer 38 is recessed at substantially the same height as the lead wire insertion holes 36, thereby forming escaping portions 38A. The escaping portions 38A are provided on both sides of the spacer portion 38 (see FIG. 4).

The capacitor accommodating wall 34 is formed with windows 39 for exposing the inner spaces S2 to the outside of the capacitor accommodating wall 34. In this way, the inner spaces S2 are widened to communicate with an outer space S1. The windows 39 penetrate through the capacitor accommodating wall 34 in inward and outward directions at corners between the tubular portion 34A and the end wall 34B. The windows 39 are provided on both widthwise sides of the capacitor accommodating wall 34. As shown in FIG. 2, the windows 39 are in a vertical central part of the capacitor accommodating wall 34 and are long and narrow in the vertical direction.

The capacitor connecting portion 33 includes two side walls 41 which at the widthwise sides. The side walls 41 are parallel and face each other. Front and rear ends of the side walls 41 are connected respectively to the terminal holding portion 31 and the capacitor holding portion 32. Specifically, the front ends of the respective side walls 41 are connected to the rear surface 31B of the terminal holding portion 31 and the rear ends thereof are connected to couplings 42 on a lower side of the electric capacitor holding portion 32. The couplings 42 extend forward from both sides of the capacitor holding portion 32.

The capacitor connecting portion 33 is formed with the outer space 51 enclosed by the side walls 41, the terminal holding portion 31 and the capacitor holding portion 32. The outer space 51 is open up and down. Further, as shown in FIG. 2, the rear ends of the side walls 41 are located before the end wall 34B of the capacitor accommodating wall 34 and lateral sides of the windows 39 are open without being covered by the side walls 41. Note that resin is not filled into the capacitor connecting portion 33, which is covered by an unillustrated cover to be mounted on the connector C with the capacitor.

A guide 43 is provided on the front side of the capacitor holding portion 32 (see FIGS. 8 and 9) for guiding the lead wires 22 from the lead wire insertion holes 36 toward the upper surfaces of the connecting portions 14 of the joint terminals 10. The guide 43 is unitary with the capacitor accommodating wall 34 and cantilevers forward from the end wall 34B. The guide 43 has a substantially constant width that is slightly smaller than the width of the end wall 34B. Slits 44 are formed adjacent to the widthwise sides of the guide 43 and are long and narrow in forward and backward directions to separate the guide 43 and the couplings 42. The guiding 43 is resiliently deformable in the vertical direction in which the lead wires 22 and the connecting portions 14 of the joint terminals 10 overlap.

The guiding portion 43 includes a leg 43A projecting forward from a lower end part of the end wall 34B, a trunk 43B standing up from the front end of the leg 43A and a head 43C projecting forward from the upper end of the trunk 43B.

The trunk 43A is at substantially the same height as the couplings 42 and the vertical thickness dimension is smaller (particularly less than about two thirds, e.g. about half) than that of the couplings 42. The trunk 43B is parallel to the end wall 34B. The upper surface of the head 43C defines a receiving portion 45 that is aligned with the lead wire insertion holes 36 and the upper surfaces of the connecting portions 14 of the joint terminals 10 and receives the lead wires 22 projecting forward from the lead wire insertion holes 36 from below. The receiving portion 45 is formed with two receiving grooves 46 recessed substantially in conformity with the outer shapes of the respective lead wires 22. Each receiving groove 46 extends substantially straight from the lead wire insertion hole 36 toward the connecting portion 14 of the joint terminal 10. A tapered portion 47 is formed in a rear end part of each receiving groove 46 for guiding the lead wire 22 into the receiving groove 46.

Figure 6:
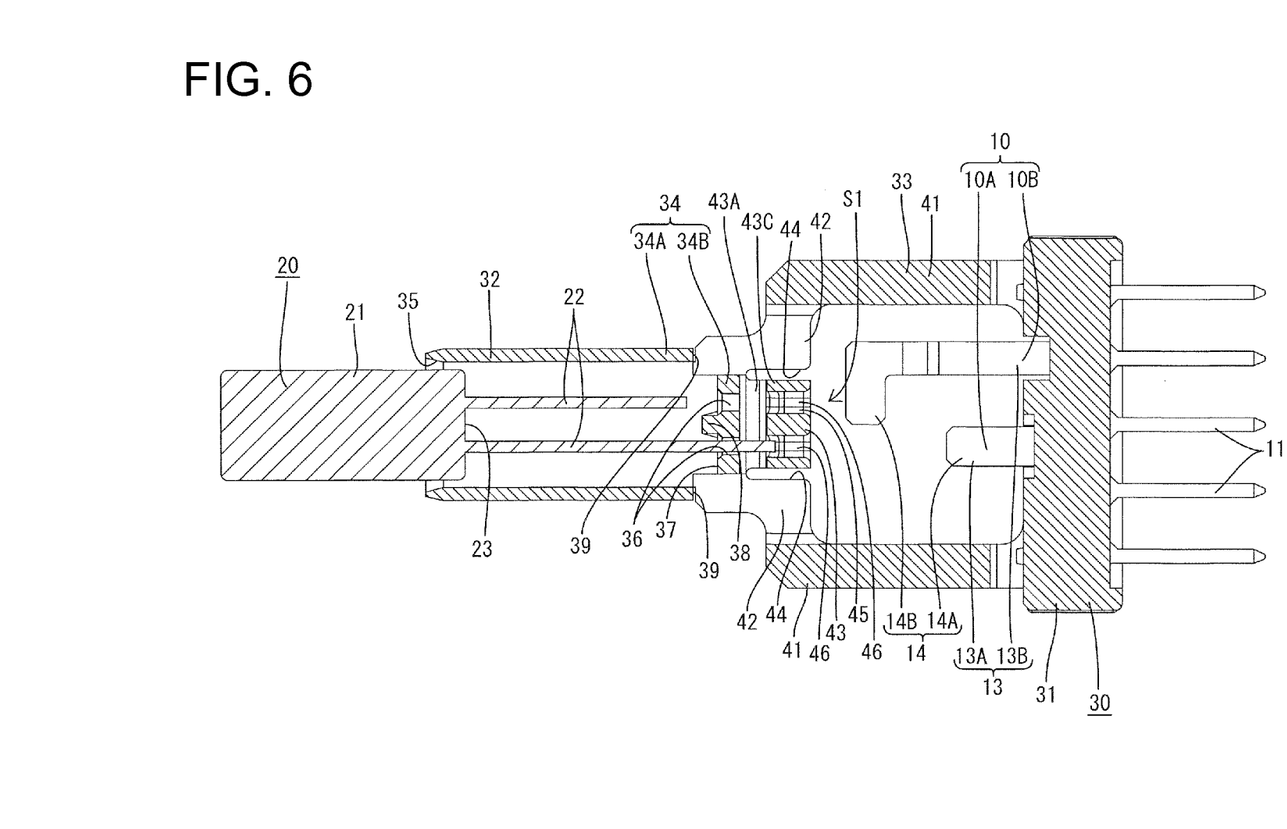
FIG. 6 is a plan view in section showing a state of accommodating the capacitor into the housing.

The capacitor 20 is attached to the housing 30 in which the joint terminals 10 are held. The capacitor 20 is inserted into the entrance 35 of the capacitor accommodating wall 34 with the lead wires 22 in the lead. Then, as shown in FIG. 6, the lead wires 22 are inserted successively into the lead wire insertion holes 36 to project forward through the lead wire insertion holes 36. The capacitor 20 is moved further forward so that the lead wires 22 that have passed through the lead wire insertion holes 36 are guided successively into the receiving grooves 46 of the guide 43 from the longer one and received by the receiving portion 45 from below. The capacitor 20 is moved further forward so that the lead wires 22 received by the receiving portion 45 move straight without being deflected laterally or down and consequently move into contact with the upper surfaces of the connecting portions 14 (see FIG. 9). Note that one of the lead wires 22 is arranged in the widthwise center of the first connecting portion 14A and the other is arranged entirely across an inwardly projecting part of the second connecting portion 14B.

The lead wires 22 and the connecting portions 14 of the joint terminals 10 vertically arranged one over the other are connected e.g. by resistance welding or soldering or conductive glue to complete the operation of connecting the joint terminals 10 held in the housing 30 and the lead wires 22 of the capacitor 20.

The inner spaces S2 and the outer space S1 of the connector C are formed around the bases of the lead wires 22 projecting from the capacitor main body 21.

Accordingly, electrolytic solution that may leak out from the capacitor 20 spreads away from the lead wires 22 toward the inner spaces S2 and is discharged to the outside of the capacitor accommodating wall 34 from the windows 39 or discharged to the outside through the discharge spaces S3 of the lead wire insertion holes 36, and spreads away from the lead wires 22 toward the outer space S1. In this way, any electrolytic solution that may leak out from the capacitor 20 spreads away from the lead wires 22 toward the inner spaces S2 formed around or adjacent to the base ends of the lead wires 22 or the outer space S1. Thus, the material or fluid (e.g. the electrolytic solution) will not adhere to and stay on the lead wires 22.

The guide 43 is provided between the lead wire insertion holes 36 and the connecting portions 14 of the joint terminals 10 for guiding the lead wires 22 from the lead wire insertion holes 36 toward the upper surfaces of the connecting portions 14 of the joint terminals 10. Thus the lead wires 22 can be arranged on the upper surfaces of the connecting portions 14 without contact with the joint terminals 10. The lead wires 22 are relatively soft and deformable and may be bent upon contact with the joint terminals 10. If that occurs, it becomes difficult to adhere and fix the lead wires 22 and the connecting portions 14. However, such a situation can be prevented and the lead wires 22 and the joint terminals 10 can be connected in a satisfactory manner since the guides 43 guide the lead wires 22 toward the upper surfaces of the connecting portions 14.

The guide 43 is resiliently deformable in the overlapping direction of the lead wires 22 and the connecting portions 14 of the joint terminals 10. The lead wires might have to be bent in fixing the lead wires arranged on the upper surfaces of the connecting portions if the guide was not resiliently deformable in the vertical direction. Further, the connecting portions of the joint terminals may vertically vibrate relative to the lead wires vertically fixed in positions by the guide and a tearing force may act on fixed parts if the connector with the capacitor vertically vibrates after the lead wires and the joint terminals are connected. However, the guide 43 follows the deformation of the lead wires 22 to prevent a situation where the guide 43 blocks satisfactory connection between the joint terminals 10 and the lead wires 22.

The invention is not limited to the above described embodiment. For example, the following embodiments also are included in the scope of the invention.

The lead wires 22 of the capacitor 20 are in the form of round pins in the above embodiment. However, the lead wires of the capacitor may be in the form of rectangular columns or the like.

The lead wires 22 and the joint terminals 10 are welded by resistance welding in the above embodiment. However, the lead wires and the joint terminals may be welded such as by laser welding or soldering.

The lead wires 22 guided by the guide 43 are held in contact with the upper surfaces of the connecting portions 14 of the joint terminals 10 in the above embodiment. However, if being guided to above the connecting portions of the joint terminals by the guide, the lead wires may not be necessarily held in contact with the upper surfaces of the connecting portions. In this case, the lead wires only have to be pressed in being fixed to the connecting portions of the joint terminals.

The front end surface 23 of the capacitor main body 21 and the rear surface 37 of the end wall 34B are spaced apart by the spacer 38 in the above embodiment. However, a stopper or the like may be provided for preventing a forward movement of the capacitor at an intermediate position of the tubular portion of the capacitor accommodating wall instead of the spacer so that the front end surface of the capacitor main body and the rear surface of the end wall may be held spaced apart.

The guide 43 projects from the end wall portion 34B in the above embodiment. However, the guide may project from the coupling, the side wall or the like.

Although the above embodiment has been described with reference to a capacitor as an exemplary electric component, it should be understood that the invention is applicable to any other electric component (e.g. a transistor, IC chip, inductance, or the like) particularly to any other component from which an inner fluid or matter may leak out.

What is claimed is:

1. A connector, comprising:
   a housing having an electric component accommodating wall with a tubular portion, an end wall with a lead wire insertion hole penetrating therethrough, and an opening opposite the end wall;
   an electric component having a column-shaped main body and at least one lead wire projecting from the main body in a longitudinal direction of the main body, the electric component configured to be accommodated in the tubular portion through the opening with the lead wire led out through the lead wire insertion hole;
   at least one terminal fitting held in the housing, the at least one terminal fitting having a connecting portion connected to the lead wire at an outer side of the electric component accommodating wall;
   at least one space formed adjacent to and substantially around a base of the lead wire projecting from a main body of the electric component; and
   at least one guide between the lead wire insertion hole and the connecting portion for guiding the lead wire from the lead wire insertion hole towards a surface of the connecting portion.

2. The connector of claim 1, wherein the electric component accommodating wall has a facing surface facing a projecting end surface of the main body of the electric component from which the lead wire projects and at least one spacer provided between the projecting end surface and the facing surface.

3. The connector of claim 2, wherein the space is formed between the projecting end surface and the facing surface.

4. The connector of claim 3, wherein the electric component accommodating wall is formed with at least one window providing communication from the space between the projecting end surface and the facing surface and areas outside of the electric component accommodating wall.

5. The connector of claim 1, wherein an inner diameter of the lead wire insertion hole is larger than an outer diameter of the lead wire.

6. The connector of claim 1, wherein the space is formed at an outer side of the lead wire insertion hole.

7. The connector of claim 1, wherein the guide is resiliently deformable in a direction in which the lead wire and the connecting portion of the terminal fitting overlap.

8. The connector of claim 7, wherein the guide includes a leg projecting forward from the end wall, a trunk projecting from the leg and a head projecting forward from the trunk.

9. The connector of claim 1, wherein a width of the guide is substantially constant and is smaller than a width of the end wall.

10. The connector of claim 1, wherein the capacitor accommodating wall is formed with at least one window for exposing the inner space to the outside of the electric component accommodating wall and wherein the inner space is widened to communicate with an outer space.

11. A connector, comprising:
    a housing with an electric component accommodating portion having at least one side wall extending in forward and backward directions and an end wall on a rear end of thereof, the end wall having a lead wire insertion hole penetrating therethrough;
    an electric component incorporated in the housing, the electric component having a main body and at least one lead wire projecting from the main body and led out through the lead wire insertion hole;
    at least one terminal fitting held in the housing having a connecting portion connected to the lead wire at an outer side of the electric component accommodating wall;
    at least one space formed adjacent to and substantially around a base of the lead wire projecting from a main body of the electric component; and
    at least one guide between the lead wire insertion hole and the connecting portion for guiding the lead wire from the lead wire insertion hole towards a surface of the connecting portion.

12. The connector of claim 11, wherein the main body of the electric component is column shaped and the lead wire projects from one end surface of the main body in a longitudinal direction of the main body.

13. The connector of claim 12, wherein the electric component accommodating wall includes a tubular portion substantially surrounding the main body of the electric component and the end wall at one end of the tubular portion.

14. A connector of claim 13, wherein the electric component is configured to be accommodated into the tubular portion through an opening opposite to the end wall with the lead wire in the lead.

* * * * *